Patented Oct. 26, 1954

2,692,898

UNITED STATES PATENT OFFICE 2,692,898

PROCESS FOR THE PREPARATION OF TETRAHYDROFLUORENONE

Hugo Christiaan Beyerman, Naarden, and Willem Louis Constantijn Veer, Oss, Netherlands, assignors to Organon, Inc., Orange, N. J., a corporation of New Jersey No Drawing. Application November 20, 1951, Serial No. 257,438

Claims priority, application Netherlands November 22, 1950

9 Claims. (Cl. 260—591)

This invention relates to partially hydrogenated fluorenone compounds, and more particularly to 1,2,3,4-tetrahydrofluorenone, and a method of making same.

One object of this invention is to provide a new and valuable partially hydrogenated fluorenone compound, the 1,2,3,4-tetrahydrofluorenone.

Another object of this invention is to provide a simple and effective process of making said 1,2,3,4-tetrahydrofluorenone.

The starting material used for the process according to the present invention is a new partially hydrogenated diphenyl carboxylic acid, the 2-phenyl-3,4,5,6-tetrahydrobenzoic acid. Said acid is obtained by heating to boiling under reflux 2-phenyl cyclohexanone in alcoholic solution with an aqueous solution of an alkali cyanide. Thereafter, acetic acid is gradually added to said boiling solution. Boiling is continued to form 2-phenyl-1-cyano-1-hydroxy cyclohexane. Said reaction solution is diluted with water. The cyano compound formed is extracted with a water insoluble solvent and is isolated from said extract. The cyano compound is then added to a mixture of pyridine and phosphorus oxychloride. The reaction mixture is heated to boiling under reflux to cause splitting off of water between the hydroxyl group and the neighboring carbon atom 2, and is then diluted with water, acidified, and extracted with a water insoluble solvent. 2-phenyl tetrahydrobenzonitrile is isolated from said extract and is boiled in an aqueous acid solution until saponified, whereby 2-phenyl tetrahydrobenzoic acid precipitates. Its melting point, on recrystallization from petroleum ether, is 155–157° C.

Said acid is the starting material for the production of the new 1,2,3,4-tetrahydrofluorenone according to this invention. The reaction proceeds according to the following equation:

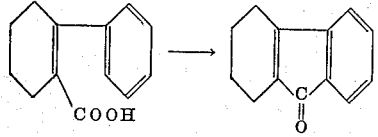

and consists in a ring closure step. In the place of the free phenyl tetrahydrobenzoic acid, its functional derivatives, such as its acid halogenides and esters, may also be employed as starting materials.

Ring closure can be effected by means of condensing agents, such as aluminum chloride, aluminum bromide, tin tetrachloride, polyphosphoric acid, liquid anhydrous hydrogen fluoride and others. Preferably, the acid chloride is used as starting material and ring closure is effected by means of anhydrous aluminum chloride according to the reaction of Friedel-Crafts.

Preferably, the reaction is carried out in the presence of an indifferent organic solvent, serving as diluting agent for the reaction mixture, such as carbon disulfide, benzene and the like.

The new 1,2,3,4-tetrahydrofluorenone is characterized by a melting point of 81–82° C. In alcoholic molar solution its absorption spectrum shows a maximum at 265 m$\mu$ (log. $\epsilon$=4.48) and a minimum at 232 m$\mu$ (log. $\epsilon$=3.62). It is a light yellow compound crystallizing in the form of needles or prisms, exhibiting, for instance, a strong antifungal activity.

The results of an elementary analysis of this compound correspond to the formula $C_{13}H_{12}O$ (Found: C=84.77 per cent; H=6.56 per cent; calculated for $C_{13}H_{12}O$: C=84.77 per cent; H=6.53 per cent).

The red 2,4-dinitrophenylhydrazone of said compound melts at 244° C. and crystallizes from xylene in the form of needles. (Elementary analysis.—Found: C=62.37 per cent; H=4.25 per cent; N=15.20 per cent. Calculated for $C_{19}H_{16}O_4N_4$: C=62.64 per cent; H=4.40 per cent; N=15.38 per cent).

1,2,3,4-tetrahydrofluorenone in a concentration of about 500 parts per million completely inhibits growth of Candida albicans in a liquid culture medium which is shaken during a ten day test period. Attempts to produce subcultures therefrom at the end of said period indicate that said microorganism has been killed.

Said new antifungal compound, in a concentration of 1:100,000 to 1:200,000 completely inhibits, for instance, growth of Trichophyton gypseum.

2-dimethylamino-6-($\beta$-diethylamino - ethoxy)-benzothiazole dihydrochloride, a known antifungal compound of high activity completely inhibits growth of said Trichophyton gypseum in a concentration of 1:2000 to 1:10,000.

The toxicity of the new 1,2,3,4-tetrahydrofluorenone compound is surprisingly low, the L. D. 50 for acute toxicity in mice on subcutaneous administration amounts to 1 to 1.3 g. per kg. of body weight, whereas the known antifungal compound mentioned above has a L. D. 50 of 0.375 g. per kg. of body weight (vide E. Grunberg et al., Trans. N. Y. Acad. Sci., Ser. II, 13 (1950) 22).

The following examples serve to illustrate the invention without, however, limiting the same to them.

Example 1

To 23.2 g. of 2-phenyl tetrahydrobenzoic acid, which has been cooled in ice, there are added 50 ml. of thionylchloride likewise cooled in ice. The mixture is allowed to stand overnight at room temperature, the excess of thionyl chloride is distilled off in a vacuum, and the residual amounts thereof are removed by the addition of benzene and renewed distillation in vacuo. The resulting residue is also distilled in vacuo. 24.2 g. of 2-phenyl tetrahydrobenzoyl chloride are obtained thereby in the form of a yellow oil having a B. P. of 165° C. at a Hg pressure of 11 mm. (*Elementary analysis.*—Found: C=71.40 per cent; H=6.29 per cent; Cl=15.97 per cent. Calculated for $C_{13}H_{13}OCl$: C=70.75 per cent; H=5.89 per cent; Cl=16.10 per cent.)

26.1 g. of freshly sublimated aluminum chloride are placed into a round bottom flask with three necks which is filled with 220 cc. of freshly distilled carbon disulfide. While stirring and taking care that moisture is excluded, 37.4 g. of freshly distilled 2-phenyl-3,4,5,6-tetrahydrobenzoyl chloride are added.

The reaction mixture of acid chloride and aluminum chloride in carbon disulfide is kept for about 5 minutes at a temperature of about 5° C. whereby hydrochloric acid gas starts to develop and the mixture acquires an orange color. The temperature is then raised and kept for half an hour at 10° C., for a further half hour at 25° C. and finally for three quarters of an hour at 40° C. During the heating period the contents of the flask are repeatedly and thoroughly shaken to effect good mixing. The reaction mixture is then allowed to cool to room temperature and is poured into a mixture of 180 g. of ice and 80 cc. of concentrated hydrochloric acid. The carbon disulfide layer is separated and the water layer is twice extracted with about 150 cc. of carbon disulfide. The combined carbon disulfide layers are dried by means of anhydrous sodium sulfate and the carbon disulfide is then distilled off in a vacuum. The residue is an orange-brown oil which, on keeping it in the cold, yields, after some time, orange-yellow needles. The oil is heated with 29 g. of N-dimethyl aniline to 180° C. for 2½ hours. After cooling, the mixture is dissolved in 170 cc. of ether. The ethereal solution is washed first with N-sulfuric acid, then with N-sodium carbonate solution in water, and finally with water and is dried by means of anhydrous sodium sulfate. The ether is distilled off and the residue obtained thereby is distilled in a high vacuum. 25.8 g. of 1,2,3,4-tetrahydrofluorenone are obtained which boils under a pressure of 0.05 mm. at 139–140° C. After cooling the distilled product, 1,2,3,4-tetrahydrofluorenone crystallizes in the form of thick hard crystals, having a melting point of 66–67° C. On repeated recrystallization, for instance, from pentane or petroleum ether of low boiling point, a very pure 1,2,3,4-tetrahydrofluorenone is obtained which has a melting point of 81–82° C. The reaction takes place according to the following equation:

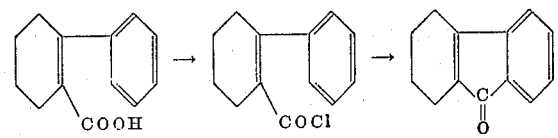

Example 2

To a mixture of 10.5 g. of anhydrous aluminum chloride and 80 ml. of dry benzene there is added a mixture of 15 g. of 2-phenyl tetrahydrobenzoyl chloride and 25 ml. of dry benzene. While stirring mechanically and excluding moisture, the reaction mixture is heated in a bath of 50–55° C. for 90 minutes. Soon hydrochloric acid gas development and brown coloring of the mixture occur. After cooling for a short period of time the mass is poured into a mixture of 45 ml. concentrated hydrochloric acid and 100 ml. of ice water. After shaking the benzene layer is removed and the aqueous layer is extracted with benzene.

The combined benzene extracts are shaken with 200 ml. of N-sodium carbonate solution for 1 hour, then washed with water and dried over calcium chloride. After evaporation of the solvent in vacuo 11.9 g. of a yellow, waxy residue are obtained, from which by recrystallization from methanol 9.5 g. of 1,2,3,4-tetrahydrofluorenone with a M. P. of 81–82° C. can be obtained.

Example 3

A solution of 13 ml. of freshly distilled anhydrous stannic chloride in 13 ml. of dry benzene is added drop by drop to a solution of 10 g. of 2-phenyl tetrahydrobenzoyl chloride in 100 ml. of dry benzene, said solution being cooled to 0° C. While stirring mechanically and excluding moisture the mixture is allowed to react at 40° C. for 4 hours. The resulting reaction mixture is processed in the same way as described in Example 2. 7.6 g. of crude 1,2,3,4-tetrahydrofluorenone are obtained thereby, yielding, in hydrochloric acid alcoholic solution, by the addition of 2,4-dinitrophenylhydrazine, 9.1 g. of crude 2,4-dinitrophenylhydrazone. This product, on successive recrystallization from dioxane and xylene, melts at 244° C. and shows no melting point depression with the 2,4-dinitrophenylhydrazone prepared from the pure ketone.

Example 4

To 6.0 g. of molten 2-phenyl tetrahydrobenzoic acid there are added 5.5 g. of phosphorus tribromide and the mixture is allowed to react at about 180° C. for 30 minutes thereby excluding moisture. After cooling 50 ml. of dry benzene are added and excess phosphorus tribromide is distilled off in vacuo together with the benzene. The resulting residue is also distilled in vacuo. The thus obtained 2-phenyl tetrahydrobenzoyl bromide boils at 190–195° C. and at a Hg pressure of 22 mm. The product is immediately subjected to a ring closure reaction as described in Example 2. 1.1 g. of 1,2,3,4-tetrahydrofluorenone are obtained thereby.

Example 5

To polyphosphoric acid prepared by the addition of 25 g. of phosphorus pentoxide to 16 ml. of sirupy orthophosphoric acid there is added 1.0 g. of 2-phenyl tetrahydrobenzoic acid. While excluding moisture the mixture is heated at 130–135° C. for 10 minutes. The brownish red mass is poured into ice water and is subsequently extracted with ether. The yellow ethereal solution is shaken successively with sodium carbonate solution and water and, after drying over calcium chloride, is evaporated to dryness. The residue is purified by recrystallization from methanol or an ether-pentane mixture. 0.5 g. of 1,2,3,4-tetrahydrofluorenone is obtained thereby.

Example 6

To 20 g. of liquid anhydrous hydrofluoric acid cooled to 5° C. there is added 1 g. of 2-phenyl tetrahydrobenzoic acid. After reaction has taken place, hydrofluoric acid is allowed to evaporate at room temperature and the residue is dissolved in ether. The ethereal solution, on processing in the same way as described in Example 5, yields 0.8 g. of crude ketone, from which by recrystallization from methanol 0.55 g. of 1,2,3,4-tetrahydrofluorenone is obtained.

Example 7

350 ml. of a solution of diazomethane in methylene chloride, containing 2.5 g. of diazomethane per liter, are poured over 1 g. of 2-phenyl tetrahydrobenzoic acid.

Right away there occurs nitrogen development, while the acid dissolves. The mixture is allowed to stand overnight at room temperature and is then evaporated to dryness.

The residue is recrystallized from methanol. Colorless needles of methyl 2-phenyl tetrahydrobenzoate melting at 69° C. are obtained. The elementary analysis of this compound corresponds to the composition $C_{14}H_{16}O_2$ (Found: C=77.56 per cent; H=7.49 per cent; calculated for $C_{14}H_{16}O_2$: C=77.77 per cent; H=7.41 per cent).

Of the methylester prepared in the above mentioned manner 1 g. is treated with polyphosphoric acid in the same manner as described in Example 5. 0.61 g. of 1,2,3,4-tetrahydrofluorenone with a M. P. of 81–82° C. is obtained thereby.

Example 8

Dry hydrochloric acid gas is introduced into 100 ml. of absolue ethanol until about 1 g. of hydrochloric acid has been absorbed. 5.0 g. of 2-phenyl tetrahydrobenzoic acid are boiled under reflux with said solution for 5 hours, thereby excluding moisture. The greater part of the ethanol is then distilled off in a vacuum, the residue is diluted with water and extracted with ether. After shaking the ethereal solution with dilute sodium carbonate solution and water, it is dried over anhydrous sodium sulfate. The residue obtained after evaporation of the solvent is distilled in vacuo. 2.6 g. of ethyl 2-phenyl tetrahydrobenzoate are obtained in the form of a colorless liquid distilling at 169–172° C., and at a Hg pressure of 14 mm. The elementary analysis corresponds to the composition $C_{15}H_{18}O_2$ (Found: C=78.10 per cent; H=7.87 per cent; calculated for $C_{15}H_{18}O_2$: C=78.26 per cent; H=7.37 per cent). 2.5 g. of said ethyl ester treated with polyphosphoric acid in the same manner as described in Examples 5 and 7 yields 1.45 g. of 1,2,3,4-tetrahydrofluorenone.

Of course, many changes and variations may be made in the reaction conditions, the reaction temperature and duration, the solvents and catalysts used, the methods of working up the reaction mixtures and of isolating and purifying the intermediates and final products, and the like by those skilled in the art in accordance with the principles set forth herein and in the claims annexed hereto.

We claim:

1. As a new compound 1,2,3,4-tetrahydrofluorenone of the general formula $C_{13}H_{12}O$, the structural formula

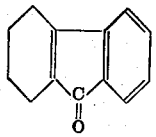

having a melting point of 81–82° C.

2. In a process of preparing 1,2,3,4-tetrahydrofluorenone, the step comprising reacting a 2-phenyl-3,4,5,6-tetrahydrobenzoic acid compound of the following formula

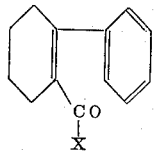

wherein X is a substituent selected from the group consisting of OH, halogen, an an OR-group, R indicating a lower alkyl radical, with a condensing agent causing ring closure to 1,2,3,4-tetrahydrofluorenone, said condensing agent being selected from the group consisting of aluminum chloride, aluminum bromide, tin tetrachloride, anhydrous hydrofluoric acid, and polyphosphoric acid.

3. In a process of producing 1,2,3,4-tetrahydrofluorenone, the step comprising reacting 2-phenyl-3,4,5,6-tetrahydrobenzoic acid chloride with aluminum chloride to cause ring closure to said 1,2,3,4-tetrahydrofluorenone.

4. In a process of producing 1,2,3,4-tetrahydrofluorenone, the step comprising reacting 2-phenyl-3,4,5,6-tetrahydrobenzoic acid with polyphosphoric acid to cause ring closure to said 1,2,3,4-tetrahydrofluorenone.

5. In a process of producing 1,2,3,4-tetrahydrofluorenone, the step comprising reacting 2-phenyl-3,4,5,6-tetrahydrobenzoic acid with anhydrous hydrofluoric acid to cause ring closure to said 1,2,3,4-tetrahydrofluorenone.

6. In a process of producing 1,2,3,4-tetrahydrofluorenone, the step comprising reacting the ethyl ester of 2-phenyl-3,4,5,6-tetrahydrobenzoic acid with polyphosphoric acid to cause ring closure to said 1,2,3,4-tetrahydrofluorenone.

7. In a process of producing 1,2,3,4-tetrahydrofluorenone, the step comprising reacting the ethyl ester of 2-phenyl-3,4,5,6-tetrahydrobenzoic acid with anhydrous hydrofluoric acid to cause ring closure to said 1,2,3,4-tetrahydrofluorenone.

8. In a process of producing 1,2,3,4-tetrahydrofluorenone, the step comprising reacting 2-phenyl-3,4,5,6-tetrahydrobenzoic acid bromide with aluminum chloride to cause ring closure to said 1,2,3,4-tetrahydrofluorenone.

9. In a process of producing 1,2,3,4-tetrahydrofluorenone, the step comprising reacting 2-phenyl-3,4,5,6-tetrahydrobenzoic acid chloride with stannic chloride to cause ring closure to said 1,2,-3,4-tetrahydrofluorenone.

References Cited in the file of this patent

Liebig's Annalen der Chemie, vol. 394 (1912), pp. 148–9.

Beilstein, 4th ed. (1926), "Handbuch der Org. Chem.," vol. 9, page 646 (abstract of Rossow), vol. 9.

Beilstein, 4th ed., Supp. 1 (1932), p. 272 (Handbuch der Org. Chem. (abstract of Bauer).

Lehrmann et al.; Ber. Deut. Chem. Gess., vol. 68 (1935), pp. 1146–54.

Cook: Jour. Chem. Soc. (London) (1936), pp. 70–71.

Richter's Organic Chemistry (Elsevier Publ. Co., N. Y., 1946), vol. III, pp. 677–8.

Jour. Am. Chem. Soc., vol. 71 (1949), p. 1833.